(12) United States Patent
Nagasaka

(10) Patent No.: US 10,582,088 B2
(45) Date of Patent: Mar. 3, 2020

(54) INFORMATION PROCESSING APPARATUS, METHOD, AND STORAGE MEDIUM FOR CAUSING PRINTER DRIVER TO GENERATE DRAWING COMMAND

(71) Applicant: CANON KABUSHIKI KAISHA, Tokyo (JP)

(72) Inventor: Hitoshi Nagasaka, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/016,798

(22) Filed: Jun. 25, 2018

(65) Prior Publication Data

US 2019/0007582 A1    Jan. 3, 2019

(30) Foreign Application Priority Data

Jun. 30, 2017   (JP) .................................. 2017-129137

(51) Int. Cl.
| | | |
|---|---|---|
| *H04N 1/407* | (2006.01) | |
| *H04N 1/44* | (2006.01) | |
| *H04N 1/00* | (2006.01) | |
| *G06F 3/12* | (2006.01) | |

(52) U.S. Cl.
CPC ......... *H04N 1/4493* (2013.01); *G06F 3/1228* (2013.01); *G06F 3/1254* (2013.01); *G06F 3/1276* (2013.01); *H04N 1/00676* (2013.01)

(58) Field of Classification Search
None
See application file for complete search history.

(56) References Cited

U.S. PATENT DOCUMENTS

| | | | |
|---|---|---|---|
| 7,920,817 B2 | 4/2011 | Oomura et al. | |
| 7,929,159 B2* | 4/2011 | Ono | H04N 1/00851 358/1.14 |
| 8,233,164 B2 | 7/2012 | Matsuda | |

(Continued)

FOREIGN PATENT DOCUMENTS

| | | |
|---|---|---|
| JP | 2001-197297 A | 7/2001 |
| JP | 2001-238075 A | 8/2001 |

OTHER PUBLICATIONS

European Search Report dated Oct. 22, 2018, in related European Patent Application No. 18180717.3.

*Primary Examiner* — Dung D Tran
(74) *Attorney, Agent, or Firm* — Venable LLP

(57) ABSTRACT

An information processing apparatus including a processor, and a memory for storing a printer driver. The processor causes the printer driver to perform accepting, from software different from the printer driver, first drawing data including rasterized object data and information of a print processing type, specifying, in a case where the print processing type included in the first drawing data is a predetermined print processing type, a target area in the rasterized object data, and generating second drawing data based on the accepted drawing data so that the specified target area of the rasterized object data is not drawn. The printer driver also generates PDL data based on the second drawing data, and transmits the PDL data to an image forming apparatus. The software performs raster image generation processing based on object data received from an application different from the software to generate the rasterized object data.

17 Claims, 14 Drawing Sheets

(56) References Cited

U.S. PATENT DOCUMENTS

| | | | |
|---|---|---|---|
| 8,270,039 B2* | 9/2012 | Pinney | G06F 3/1204 358/1.15 |
| 2009/0097047 A1 | 4/2009 | Mitsui | |
| 2009/0147288 A1* | 6/2009 | Matsuda | G06K 15/02 358/1.9 |
| 2009/0244637 A1 | 10/2009 | Miyazaki et al. | |
| 2009/0262394 A1* | 10/2009 | Adachi | G06F 3/1208 358/1.15 |
| 2011/0194726 A1 | 8/2011 | Das Gupta et al. | |
| 2015/0178604 A1* | 6/2015 | Sawada | G06F 3/1208 358/1.15 |
| 2015/0228045 A1 | 8/2015 | Mehta et al. | |
| 2017/0364317 A1* | 12/2017 | Nagasaka | G06F 3/1203 |
| 2018/0032849 A1* | 2/2018 | Nakata | G06K 15/1276 |
| 2018/0253889 A1* | 9/2018 | Nagasaka | G06T 11/00 |

* cited by examiner

INFORMATION PROCESSING APPARATUS, METHOD, AND STORAGE MEDIUM FOR CAUSING PRINTER DRIVER TO GENERATE DRAWING COMMAND

BACKGROUND OF THE INVENTION

Field of the Invention

The present invention relates to a technique to convert input drawing data into print data in a format that a printing apparatus can output.

Description of the Related Art

Conventionally, as one of copy preventing techniques of printed matter whose being the original is regarded as important, such as a business form and an in-house confidential document, there is a technique to print a special pattern called a copy-forgery-inhibited pattern on the background of printed matter by using a printer driver and a printer (for example, see Japanese Patent Laid-Open No. 2001-197297 and Japanese Patent Laid-Open No. 2001-238075). A copy-forgery-inhibited pattern on printed matter seems like a background pattern having no particular meaning to the human eye, but in the case where the printed matter is duplicated, a character or a figure appears on the duplicate (paper). By using this copy-forgery-inhibited pattern printing technique, it is possible to identify whether the printed matter is the "original" or a "copy", and therefore, an effect to prevent an unauthorized copy by a third person can be expected. This copy-forgery-inhibited pattern printing includes "background copy-forgery-inhibited pattern printing" that prints a copy-forgery-inhibited pattern drawing only on the portion (background portion) where a drawing object within a document page does not exist and "foreground copy-forgery-inhibited pattern printing" that prints a copy-forgery-inhibited pattern drawing also on a drawing object. Here, a specific example is shown with reference to FIG. 1A to FIG. 1C. FIG. 1A shows printed matter by normal printing (non-copy-forgery-inhibited pattern printing), FIG. 1B shows printed matter by background copy-forgery-inhibited pattern printing, and FIG. 1C shows printed matter by foreground copy-forgery-inhibited pattern printing, respectively.

At present, as the printer drivers for the Windows (registered trademark) OS of Microsoft Corporation, two kinds of printer driver, that is, the Version 3 printer driver (hereinafter, "V3 driver") and the Version 4 printer driver (hereinafter, "V4 driver") exist. The V3 driver is a printer driver that generates print data from drawing data in the GDI (Graphics Device Interface) format. Then, the V4 driver is a printer driver that generates print data from drawing data in the XPS (XML Paper Specification) format. A printing processing flow using GDI is called a "GDI print path" and a printing processing flow using XPS is called an "XPS print path". The GDI print path and the XPS print path is not in an exclusive relationship and for example, it is also possible to convert drawing data in the GDI format generated by an application using GDI into drawing data in the XPS format and to generate print data by the V4 driver. At this time, conversion from GDI into XPS is performed by a conversion module called MXDC (Microsoft XPS Document Converter).

As described above, XPS drawing data needs to be input to the V4 driver without exception. Here, in the case where the drawing object is complicated or where the number of drawing objects is large, or in the case of an object that cannot be represented completely, processing to partially convert a vector drawing into a raster drawing (hereinafter, called "raster image generation processing") is performed. There is a case where this raster image generation processing is performed in an application that uses GDI (hereinafter, "GDI application") or in the V4 driver, in addition to the above-described MXDC. A raster drawing generated by the raster image generation processing is a rectangular image including a processing-target drawing object. Then, this raster image generation processing is generally performed for an adjacent peripheral area where no drawing object exists on the premise that the area is white. Consequently, in a rectangular raster image generated by the raster image generation processing, a portion where the drawing object itself is not drawn is represented by white pixels.

Here, in the situation in which the background copy-forgery-inhibited pattern printing described previously is performed, in the case where the raster image generation processing on the premise that the object periphery is white has been performed for the drawing data, there is a case where an unnatural white area occurs on the pattern of the copy-forgery-inhibited pattern. FIG. 2A to FIG. 2C show specific examples thereof. FIG. 2A shows an example of a document page on a GDI application and a circular object 201 of the graphics attribute exists as a drawing object. Here, it is assumed that gradation drawing is specified for the circular object 201. FIG. 2B shows a state of the document page after the raster image generation processing is performed on the premise that the periphery (background) of the circular object 202 is white. In FIG. 2B, a rectangle 202 that circumscribes the circular object 201 indicates an area whose attribute has changed from graphics to image by the raster image generation processing. Then, an area 203 within the rectangular area 202 except for the portion of the circular object 201 is an area of white pixels for which the raster image generation processing has been performed on the premise that the periphery is white. FIG. 2C shows the results of performing printing by adding a background copy-forgery-inhibited pattern to the document page after the raster image generation processing shown in FIG. 2B. From FIG. 2C, it is known that the portion of the area 203 where the pattern of a copy-forgery-inhibited pattern should be formed because the area is originally the background overlaps the pattern of the copy-forgery-inhibited pattern as an unnatural white area. The occurrence of an unnatural white area that impedes the pattern of the copy-forgery-inhibited pattern such as this is not favorable for a user who makes use of the background copy-forgery-inhibited pattern printing. Then, the problem of the occurrence of such an unnatural white area is not limited to the copy-forgery-inhibited pattern printing in which printing is performed by combining a copy-forgery-inhibited pattern image with a document page and the problem may occur in common in general layer printing (technique to perform printing by combining data prepared separately from data of a document page).

SUMMARY OF THE INVENTION

The information processing apparatus according to the present invention is an information processing apparatus including: a processor; and a memory for storing a printer driver, and the processor causes the printer driver to perform: specifying a cutting-off area in an image object included in input drawing data; changing the input drawing data so that the specified cutting-off area in the image object is not drawn; and generating a print job based on the changed drawing data.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In a printing system of the present embodiment, based on XPS drawing data input via MXDC, the V4 driver generates a print job and outputs to a printing apparatus. Then, at the time of generating a print job, measures are taken so that the above-described unnatural white area does not occur in resultant matter of layer printing. In the following, detailed explanation is given.

Figure 3:
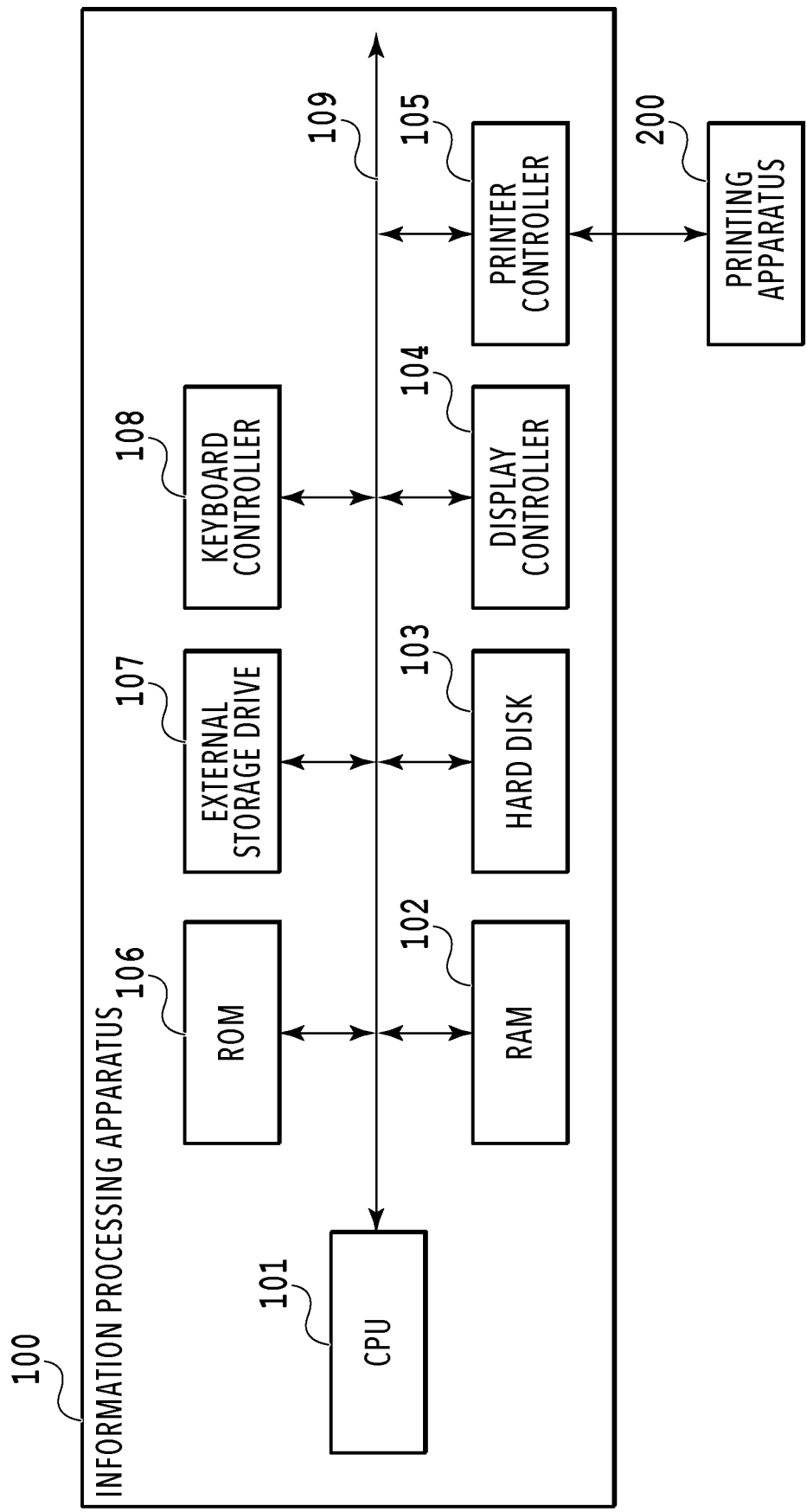
FIG. 3 is a block diagram showing an example of a hardware configuration of an information processing apparatus.

FIG. 3 is a block diagram showing an example of a hardware configuration of an information processing apparatus. The configuration shown in FIG. 3 is an example and an information processing apparatus 100 may be standalone equipment or a system including a plurality of pieces of equipment connected via a network, such as LAN and WAN.

The information processing apparatus 100 implements various kinds of processing by a CPU 101 executing processing programs stored in a ROM 106 and a hard disk 103 and centralizedly controls each unit connected to a system bus 109. Further, the CPU 101 performs various kinds of processing, such as opening a window registered in advance, based on a command specified by a mouse cursor and the like. For example, in the case where a user gives instructions to perform printing, the CPU 101 opens a window for printing setting and performs various settings for a printer driver (not shown schematically), to be described later. A RAM 102 functions as a main memory, a work area, and so on of the CPU 101. In the hard disk 103, an OS, a boot program, various applications, font data, user files, edited files, and so on are stored. The printer driver is also saved in the hard disk 103. A display controller 104 controls a display of a display, not shown schematically. A printer controller 105 is connected to a printing apparatus 200 via a predetermined bidirectional interface (not shown schematically) and in charge of communication control with the printing apparatus 200. For example, the CPU 101 performs processing to load (rasterize) an outline font onto a display information RAM set on the RAM 102 and enables WYSIWYG (What You See Is What You Get) on the display. An external storage drive 107 controls access with a storage medium, such as a CD and a DVD. A keyboard controller 108 controls a key input from a keyboard and a pointing device.

Figure 4:
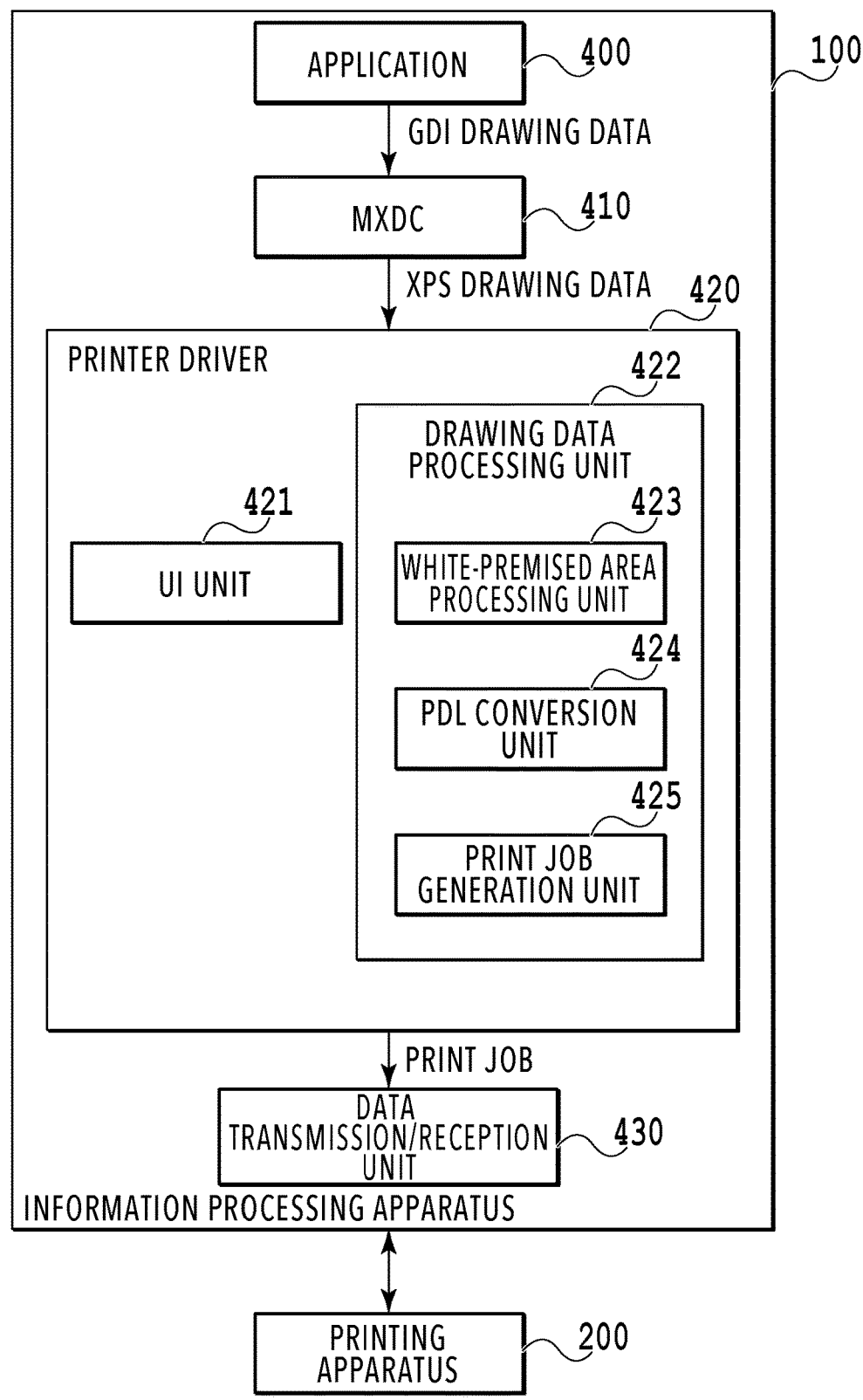
FIG. 4 is a block diagram showing an example of a software configuration of the information processing apparatus.

FIG. 4 is a block diagram showing an example of a software configuration of the information processing apparatus. The information processing apparatus 100 is connected with the printing apparatus 200, to be described later, via the printer controller 105 described previously. In the information processing apparatus 100, an operating system (hereinafter, OS), not shown schematically, is installed. As an OS, mention is made of, for example, Windows (registered trademark). An application 400 is software that generates various documents and the like, corresponding to the GDI application described previously, and runs on the OS. MXDC 410 converts drawing data issued by the application 400 using GDI into XPS drawing data that can be handled by the V4 driver. At this time, for the drawing object (hereinafter, simply an "object") that meets a predetermined condition, the raster image generation processing described previously is performed by the MXDC 410 and data of an image including the peripheral area of the object (normally, a rectangular area circumscribing the object) is generated.

A printer driver 420 as the V4 driver is software that generates a print job for which the printing apparatus 200 is caused to perform printing processing. The printer driver 420 generates a print job by converting XPS drawing data received from the MXDC 410 into PDL whose data format can be processed by the printing apparatus 200. In a print job, in addition to printing-target image data described in PDL, information (printing setting information) necessary at the time of printing processing, such as the sheet size, the number of copies, the layout, such as N-up printing and both-side printing, and the color/monochrome setting, is included.

The printer driver 420 includes a UI unit 421 and a drawing data processing unit 422. The UI unit 421 displays a UI screen for a user to perform various settings at the time of printing processing and to give instructions to start printing, and provides a function relating to a user interface, such as a function to process information input to the UI screen. The drawing data processing unit 422 generates the above-described print job based on XPS drawing data received from the MXDC 410. The drawing data processing unit 422 includes a white-premised area processing unit 423, a PDL conversion unit 424, and a print job generation unit 425. In the following, each unit making up the drawing data processing unit 422 is explained.

The white-premised area processing unit 423 analyzes input XPS drawing data and performs processing to add or change a drawing command so that an unnatural white area does not occur on the periphery of an object (for example, so that the pattern of a copy-forgery-inhibited pattern is drawn appropriately in the case of background copy-forgery-inhibited pattern printing).

The PDL conversion unit 424 generates drawing data in the PDL format that can be processed in the printing apparatus 200 from the drawing data to which a drawing command is added or whose drawing command is changed as needed. PDL (Page Description Language) includes, for example, PS (made by Adobe Systems) and PCL (made by HP Company), but is not limited particularly.

The print job generation unit 425 generates a print job including the generated PDL drawing data and printing setting information. The generated print jog is sent to the printing apparatus 200 by a data transmission/reception unit 430, which is one of the functions of the OS. Then, the printing apparatus 200 performs printing processing in accordance with the print job received from the information processing apparatus 100. Specifically, the printing apparatus 200 forms an image on a printing medium, such as paper, after performing necessary processing, such as rendering and quantization, for the PDL drawing data included in the print job.

Figure 5:
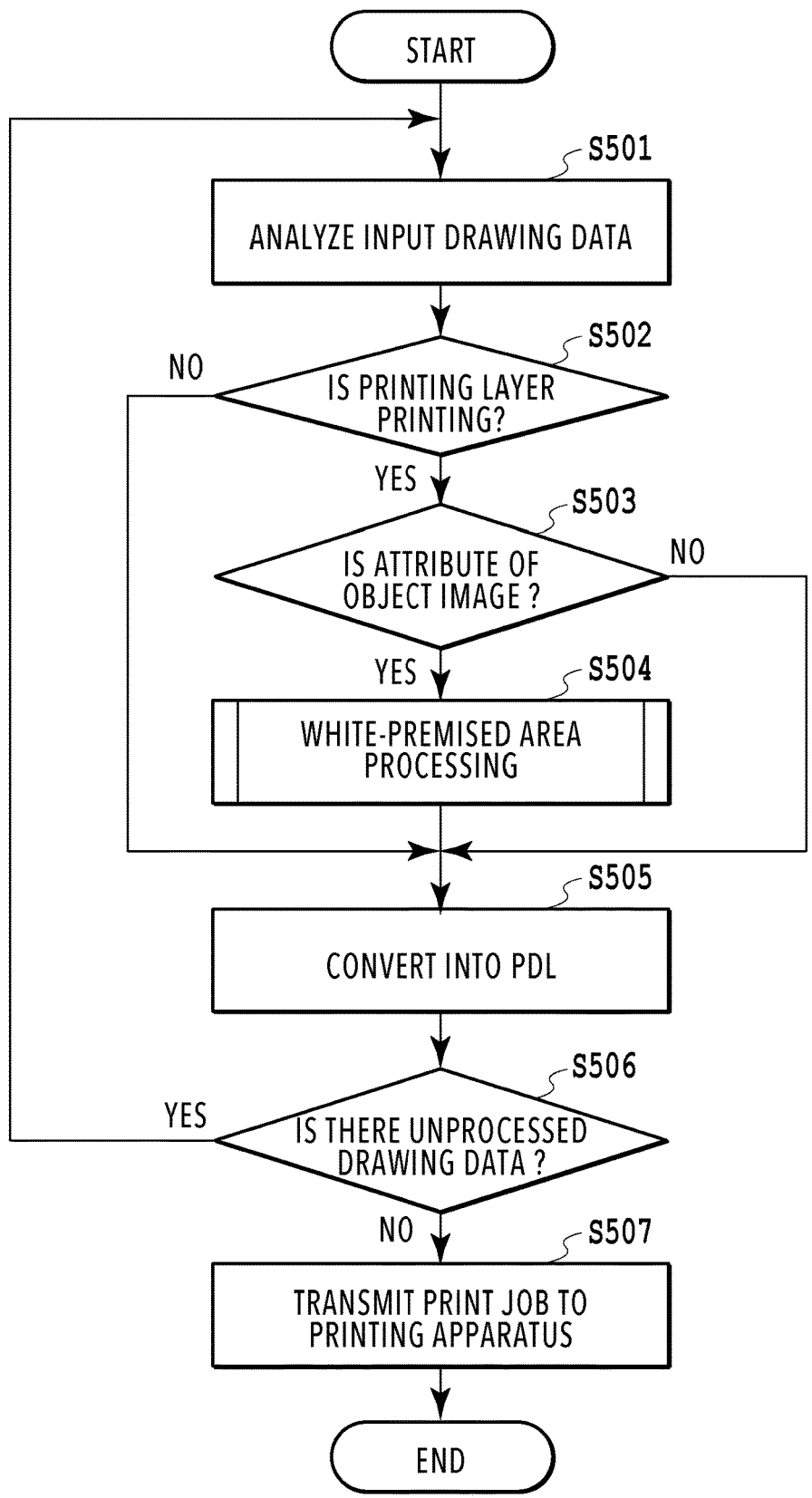
FIG. 5 is a flowchart showing a flow of a series of processing to generate a print job based on XPS drawing data.

Following the above, processing in the drawing data processing unit 422 is explained in detail. FIG. 5 is a flowchart showing a flow of a series of processing to generate a print job based on XPS drawing data according to the present embodiment. In the case where a user activates the application 400 and gives instructions to print a desired document file and the like, GDI drawing data issued by the application using GDI is input to the MXDC 410. At the time of converting the GDI drawing data into XPS drawing data, the MXDC 410 performs the raster image generation processing described previously for an object that satisfies a predetermined condition. In the case where the XPS drawing data thus generated is input to the printer driver 420 from the MXDC 410, the processing along the flow in FIG. 5 starts. In the following, the flow in FIG. 5 is explained in detail.

The XPS drawing data input from the MXDC 410 is first analyzed in the white-premised area processing unit 423 (step 501). Here, the XPS drawing data includes information on a print ticket describing a printing method (specification of layer printing, specification of color/monochrome, specification of one-side/both-side, and so on), a drawing command corresponding to the attribute (text, image, graphics, and so on) of each object, and so on. In this case, on a condition that copy-forgery-inhibited pattern printing is specified as layer printing, more detailed information, such as background copy-forgery-inhibited pattern/foreground copy-forgery-inhibited pattern, is also described in a print ticket. The layer printing includes, for example, form overlay printing (technique in which data to be printed on every page is created in advance as a form file and printing is performed by superimposing a print document and the form file at the time of actual printing) and the like, in addition to copy-forgery-inhibited pattern printing.

Then, based on the analysis results at step 501, the processing is branched to performing the white-premised area processing or not performing (steps 502 and 503). Specifically, in the case where layer printing is specified in the drawing data (Yes at step 502) and the attribute of the object is image (Yes at step 503), the processing advances to step 504 and the white-premised area processing is performed. In the other cases (in the case where layer printing is not specified (No at step 502) and in the case where the attribute of the object is non-image, such as graphics and text (No at step 503)), the white-premised area processing (step 504) is skipped and the processing advances to step 505. The reason the processing is branched like this is that an unnatural white area on the periphery of an object, described in the problem of the present invention, occurs in the case of the layer printing and in the case where data of the object and the periphery thereof is generated by the raster image generation processing. However, in the case of non-layer printing and in the case where the object attribute is non-image, no problem of the operation occurs even though the white-premised area processing is performed. Details of the white-premised area processing at step 504 will be described later with reference to another flow. The XPS drawing data for which the white-premised area processing has been performed as needed is sent to the PDL conversion unit 424. Normally, the input XPS drawing data is delivered to the PDL conversion unit 424 in the format of intermediate data, but this is not important in the present invention, and therefore, omitted here.

In the PDL conversion unit 424, drawing data in the PDL format that the printing apparatus 200 can receive is generated based on drawing data received from the white-premised area processing unit 423 (step 505). Then, in the case where the processing of all the XPS drawing data relating to the document file and the like for which printing instructions are given is completed (No at step 506), the processing advances to step 507. On the other hand, in the case where there is unprocessed XPS drawing data (Yes at step 506), the processing returns to step 501 and the next XPS drawing data is analyzed.

Then, in the print job generation unit 425, a print job is generated by adding header information, such as printing settings, to the drawing data in the PDL format received from the PDL conversion unit 424 and the print job is sent to the printing apparatus 200 (step 507). The printing apparatus 200 performs printing processing in accordance with the received print job.

The above is the outline of the print job generation processing based on input XPS drawing data in the V4 driver according to the present embodiment. The above-described explanation is an explanation that supposes the raster image generation processing on the premise that the background of an object is white is performed in the MXDC 410. In the case of implementation in which raster image generation processing is performed on the printer driver side, the printer driver is configured so as to perform the white-premised area processing described previously after the raster image generation processing.

<White-Premised Area Processing>

Figure 6:
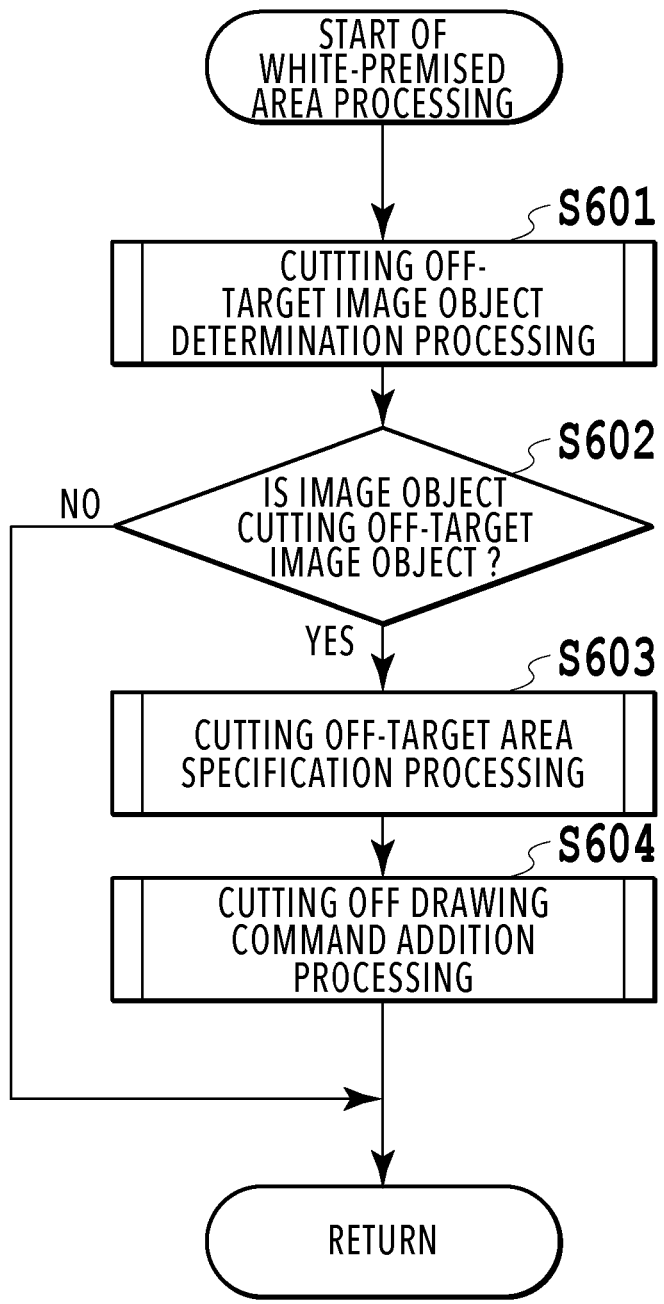
FIG. 6 is a flowchart showing a rough flow of white-premised area processing performed for an image object in the situation of layer printing.

Following the above, the processing (step 504) in the white-premised area processing unit 423, which is the most important in the flow in FIG. 5 described previously, is explained in detail. FIG. 6 is a flowchart showing a rough flow of the white-premised area processing performed for an object of the image attribute (hereinafter, "image object") in the situation of layer printing.

First, at step 601, processing (cutting off-target image determination processing) to determine whether or not a processing-target image object is an image object whose white area located inside thereof should be cut off is performed. Details of the cutting off-target image determination processing will be separately described later with reference to the flow in FIG. 7. In the case where the results of the determination indicate that the image object is a cutting off-target image object, the processing advances to step 603 and in the case of a non-cutting off-target image object, this processing is exited.

At step 603, processing (cutting off-target area specification processing) to specify which portion within the image object is to be cut off is performed for the cutting off-target image object. Details of the cutting off-target area specification processing will also be separately described later with reference to the flow in FIG. 11.

At step 604, processing (cutting off drawing command addition processing) to add a drawing command for cutting off an area specified at step 603 is performed and the input drawing data is changed. Details of the cutting off drawing command addition processing will also be separately described later with reference to the flow in FIG. 13.

The above is a rough flow of the white-premised area processing. By the processing such as this, for example, in the case of the background copy-forgery-inhibited pattern printing described previously, the white area within an object whose image data has been generated by the raster image generation processing is cut off and a state is brought about where a drawing behind the area can be viewed, and therefore, it is made possible to appropriately display the pattern of a copy-forgery-inhibited pattern. Following the above, each sub process included in the flow in FIG. 6 is explained.

<Cutting Off-Target Image Object Determination Processing>

Figure 7:
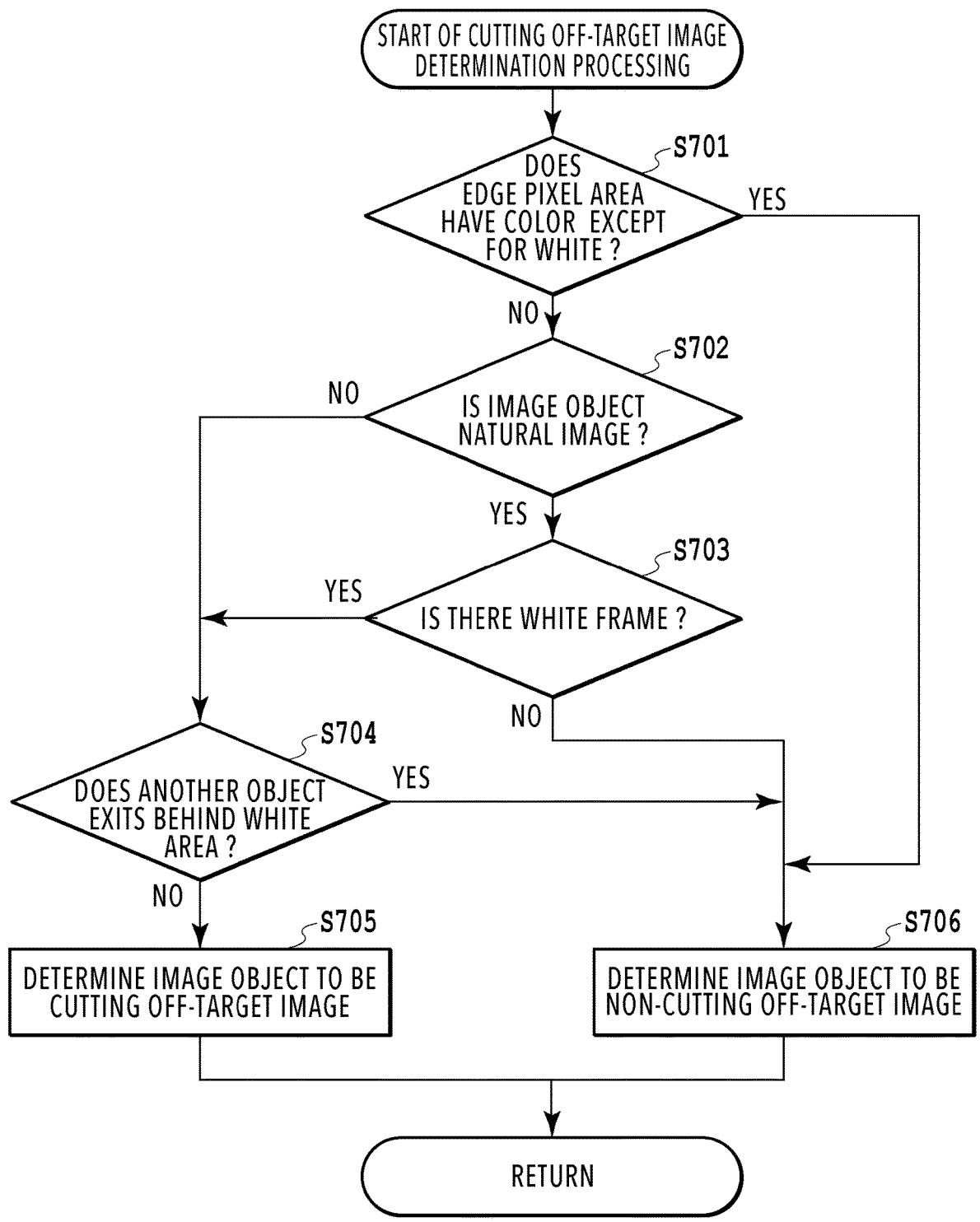
FIG. 7 is a flowchart showing a flow of cutting off-target image object determination processing.

FIG. 7 is a flowchart showing a flow of the cutting off-target image object determination processing. In the following, along the flow in FIG. 7, detailed explanation is given with reference to a specific example of determination results at each step.

Figure 1C:
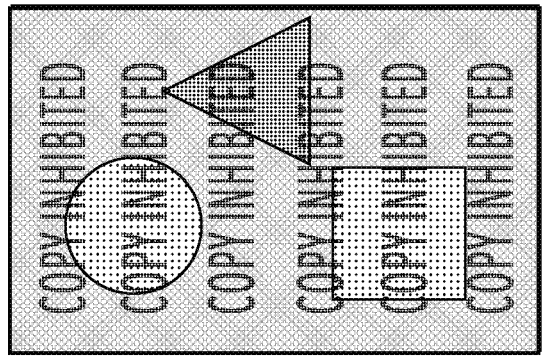
FIG. 1A to FIG. 1C are diagrams explaining copy-forgery-inhibited pattern printing.
Figure 1B:
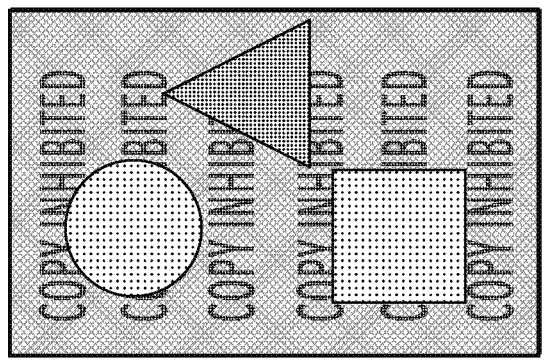
Figure 1A:
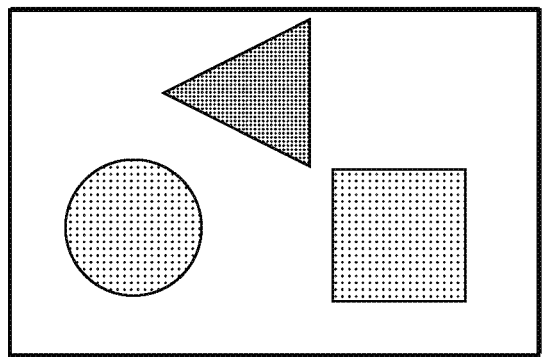
Figure 2C:
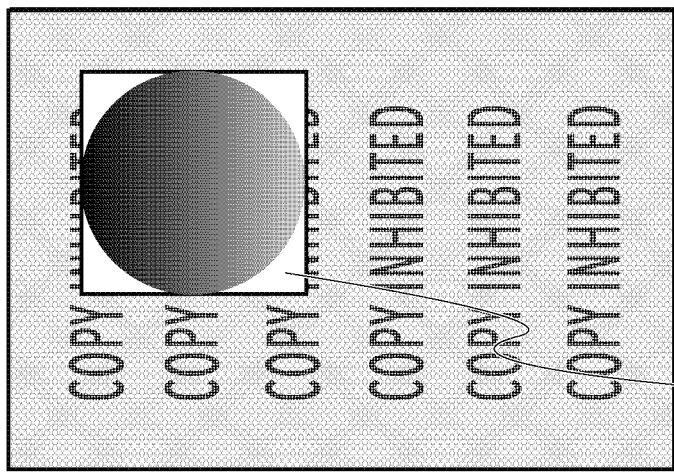
FIG. 2A to FIG. 2C are diagrams showing the way the pattern of a copy-forgery-inhibited pattern becomes white unnaturally by the influence of raster image generation processing on the premise that the background is white.
Figure 2B:
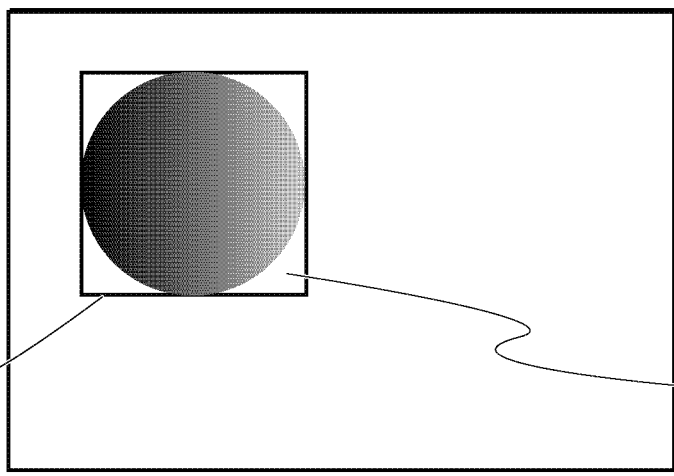
Figure 2A:
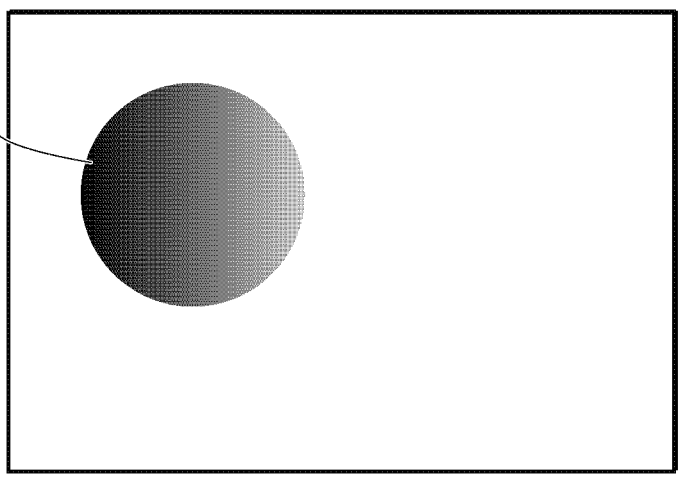
Figure 8:
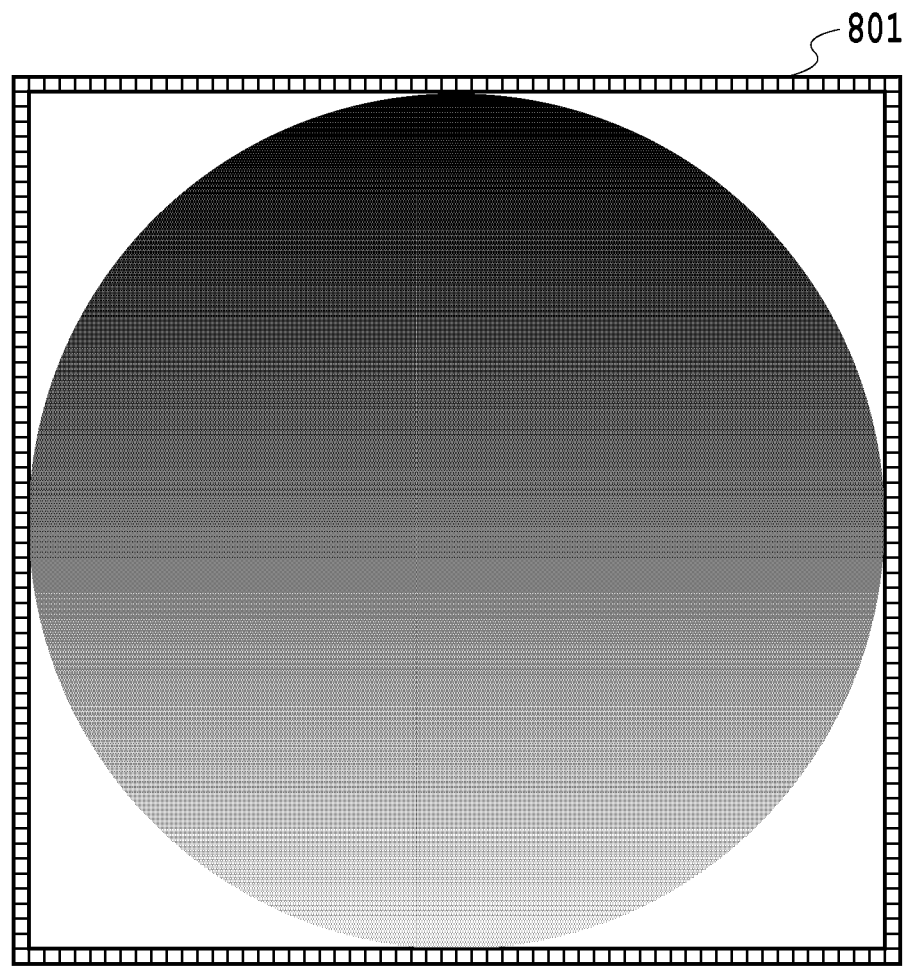
FIG. 8 is a diagram explaining an edge pixel area.
Figure 9:
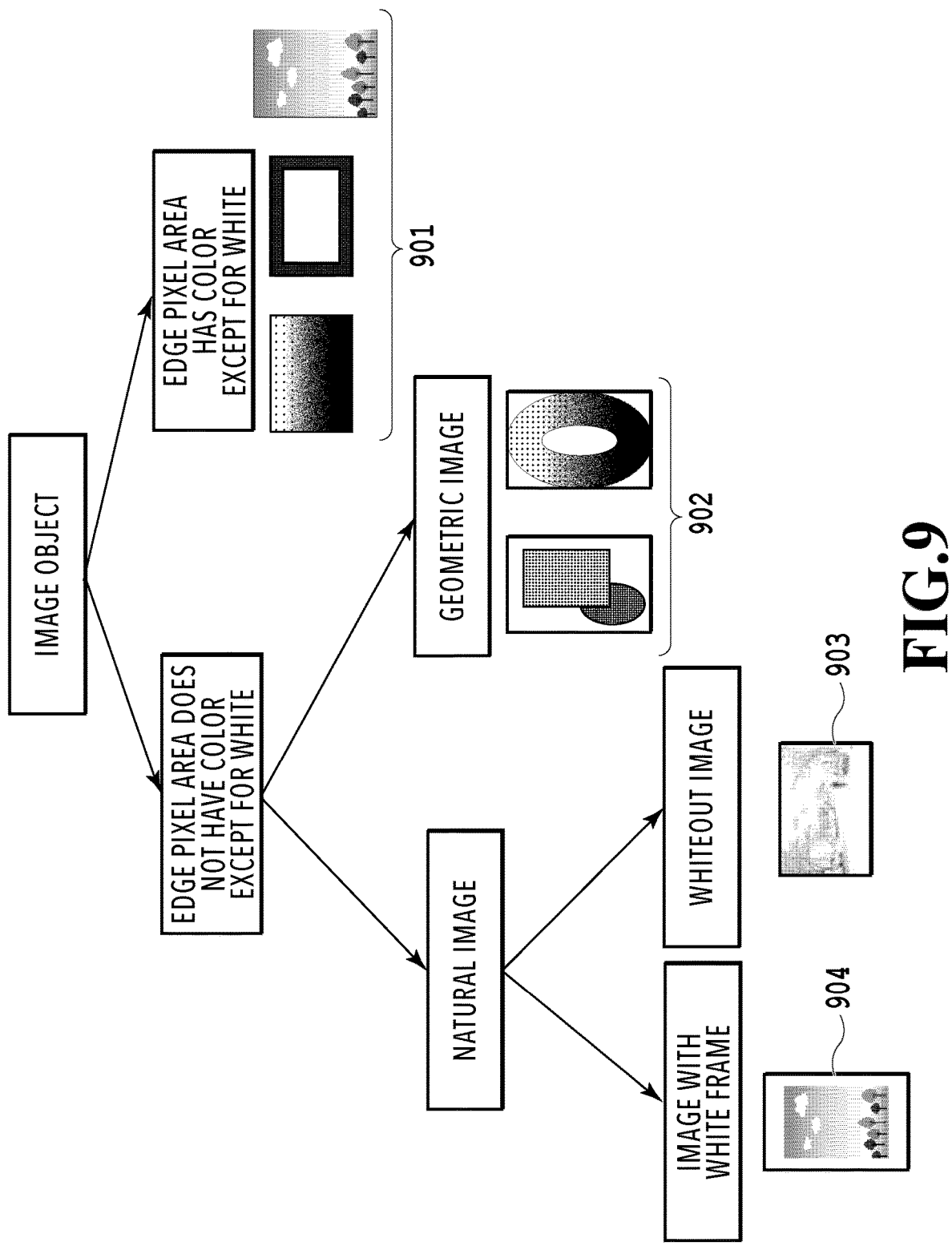
FIG. 9 is a diagram showing various specific examples of an image object.

At step 701, whether or not an edge pixel area in a determination processing-target image object has a color except for white is determined. Here, the edge pixel area refers to an area having a width of one pixel making up an edge inside the image object. FIG. 8 is a diagram explaining the edge pixel area. FIG. 8 is an enlarged view of the area 202 (see FIG. 2B) whose image data has been generated by the raster image generation processing and the portion having a width of one pixel indicated by reference symbol 801 indicates the edge pixel area. Then, by the determination of whether an area has a color except for white, first, whether each pixel making up the edge pixel area is perfectly white is specified. Then, threshold value processing to determine whether the ratio of perfectly white pixels to all the pixels making up the edge pixel area exceeds a predetermined ratio (for example, 50%) is performed. In this case, the perfectly white pixel refers to a pixel whose pixel values in the case where color information per pixel is represented by eight bits are (R, G, B)=(255, 255, 255). The reason that the determination of whether an area has a color except for white is performed here with perfect white as a reference is that in the case of white whose pixel values are other than (R, G, B)=(255, 255, 255), a possibility is strong that the white is specified intentionally by a user, and therefore, such a white area is left. Consequently, in the case where it is considered that there is no risk to impede user's intention, it may also be possible to regard the case where, for example, the pixel values are larger than or equal to (R, G, B)=(250, 250, 250) as being the above-described perfect white. In the case where it is determined that the edge pixel area does not have a color except for white, the processing advances to step 702. On the other hand, in the case where it is determined that the edge pixel area has a color except for white, the processing advances to step 706. FIG. 9 is a diagram showing various specific examples of an image object. For example, in the case of a natural image or a geometric image drawn close to the frame as indicated by reference symbol 901 in FIG. 9, it is determined that the edge pixel area has a color except for white at this step and the image object is taken to be a non-cutting off-target image object (step 706).

At step 702, whether or not the determination processing-target image object is a natural image is determined. For the determination of whether the image object is a natural image, it may be possible to apply a publicly known determination method based on the number of used colors or the feature amount using a histogram. In the case where it is determined that the image object is a natural image, the processing advances to step 703. On the other hand, in the case where it is determined that the image object is not a natural image, the processing advances to step 704. For example, in the case of a geometric image as indicated by reference symbol 902 in FIG. 9 (the edge portion of the image is perfectly white), the processing advance to step 704.

At step 703, whether or not there is a white frame in the processing-target image object is determined. Here, how many completely white pixels continue in the inward direction from the above-described edge pixel area is found at the top, bottom, left, and right ends of the processing-target image object and in the case where the minimum value of the numbers of pixels found at the top, bottom, left, and right ends, respectively, is larger than or equal to a predetermined number of pixels, it is determined that there is a white frame. In this case, the predetermined number of pixels is 48 at the time of determining, for example, a white frame whose width is 2 mm or more with an image resolution of 600 dpi, In the case where it is determined that there is a white frame, the processing advances to step 704. On the other hand, in the case where it is determined that there is no white frame, the processing advances to step 706. For example, reference symbol 903 indicates a so-called whiteout image for which it is determined that there is no white frame and in such a case, the processing advances to step 706.

At step 704, whether or not another object exists behind the processing-target image object is determined. Whether another object exists is determined by referring to the coordinates of the position of the object relating to the already-processed drawing data and in the case where even a part thereof overlaps, it is determined that another object exists behind. In the case where it is determined that there is not another object behind, the processing advances to step 705. On the other hand, in the case where it is determined that there is another object behind, the processing advances to step 706.

Figure 10A:
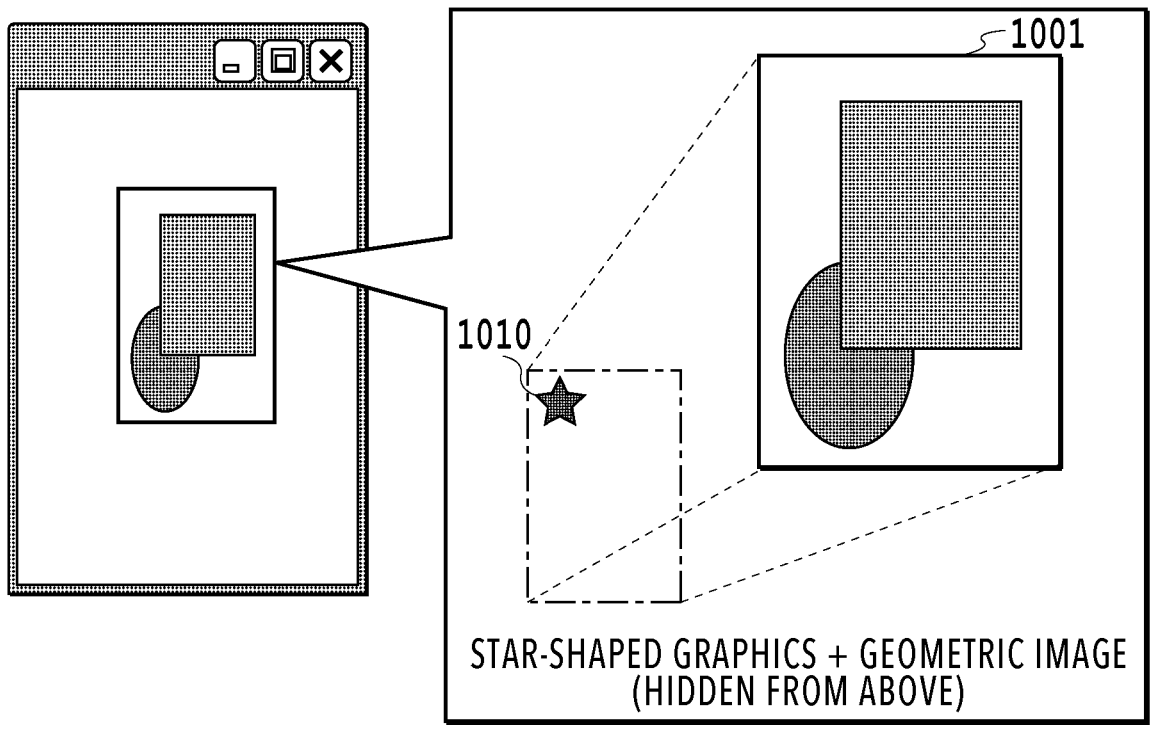
FIG. 10A and FIG. 10B are diagrams showing examples of non-cutting off-target image objects.
Figure 10B:
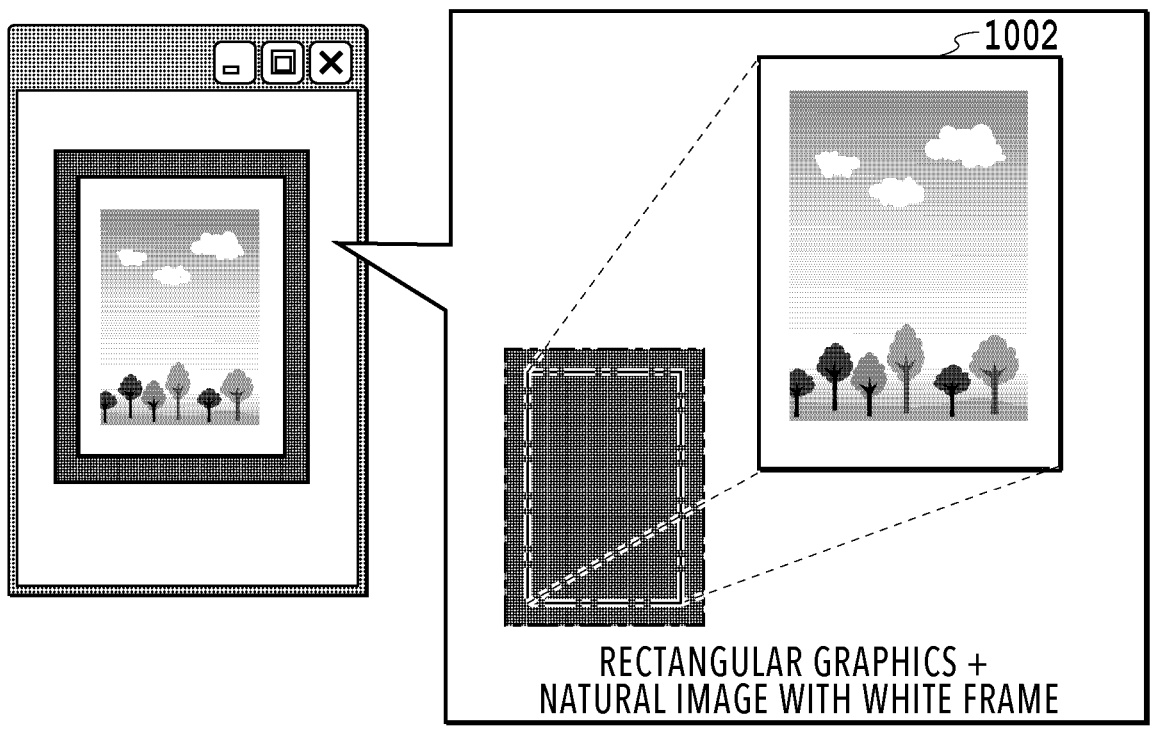

At step 705, the processing-target image object is determined to be an image object whose white area located inside thereof should be cut off. Then, at step 706, the processing-target image object is determined to be an image object whose white area located inside thereof is not cut off. FIG. 10A and FIG. 10B are diagrams showing examples of image objects for which it is determined that the inside white area is left (non-cutting off target) because there is another object behind. White areas 1001 and 1002 in each image object in FIG. 10A and FIG. 10B are not generated by the raster image generation processing being performed on the premise that the background is white, but are originally the white areas.

For example, in FIG. 10A, in the case where the white area 1001 is cut off, a star-shaped object 1010 comes to be viewed, which is originally hidden by the white area and not viewed. In order to prevent such a situation, in the case where another object exists behind, the image object is taken to be a non-cutting off target.

The above is the contents of the cutting off-target image object determination processing. In this manner, an image object whose inside white area should be cut off is specified.

<Cutting Off-Target Area Specification Processing>

Figure 11:
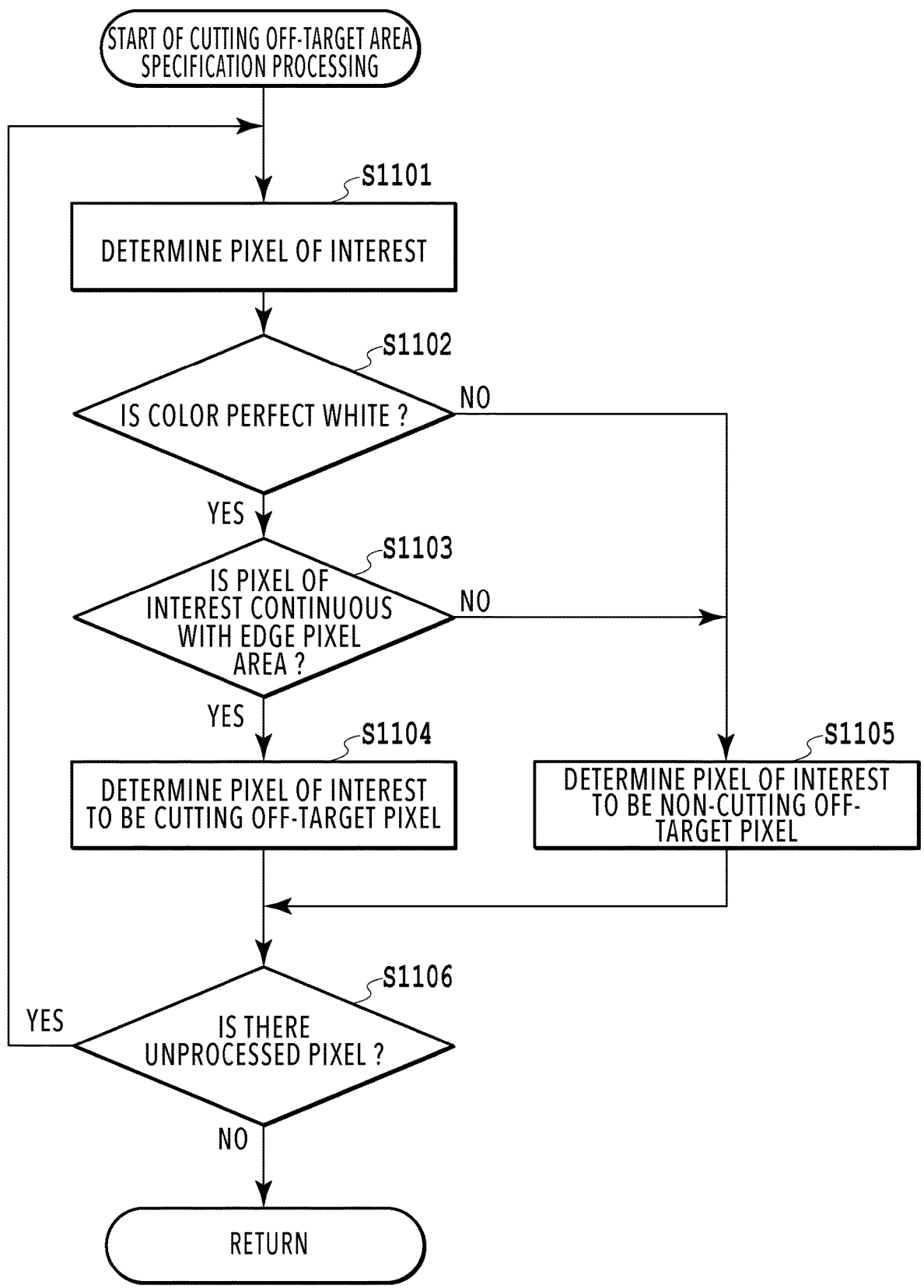
FIG. 11 is a flowchart showing a flow of cutting off-target area specification processing.

FIG. 11 is a flowchart showing a flow of the cutting off-target area specification processing. In the following, along the flow in FIG. 11, detailed explanation is given.

At step 1101, from the pixels making up the cutting off-target image object determined by the cutting off-target image object determination processing described previously (flow in FIG. 7), a pixel on which attention is focused is determined. Then, at step 1102, whether or not the color of the pixel of interest is complete white is determined. In the case where the color is complete white, the processing advances to step 1103 and in the case where the color is not complete white, the processing advances to step 1105. The meaning of "complete white" is the same as explained at step 701 of the flow in FIG. 7.

At step 1103 that follows, whether or not the completely white pixel of interest is the pixel adjacent to at least one completely white pixel making up the edge pixel area described previously is determined. This means that whether the pixel of interest is included in a part of the edge pixel area, or whether the pixel of interest is continuous with the edge pixel area is determined. In the case where the pixel of interest is a part of the edge pixel area, or where the pixel of interest is a completely white pixel continuous with the edge pixel area, the processing advances to step 1104. On the other hand, in the case where the pixel of interest is a completely white pixel that is not included in the edge pixel area and not continuous with the edge pixel area, the processing advances to step 1105.

At step 1104, the pixel of interest is determined to be a cutting off-target pixel. Further, at step 1105, the pixel of interest is determined to be a non-cutting off-target pixel. Then, at step 1106, whether or not the processing has been completed for all the pixels within the cutting off-target image is determined. In the case where there is an unprocessed pixel, the processing returns to step 1101, and the next pixel is determined to be the pixel of interest and the processing is continued. On the other hand, in the case where all the pixels within the cutting off-target image have been processed, this processing is terminated.

Figure 12:
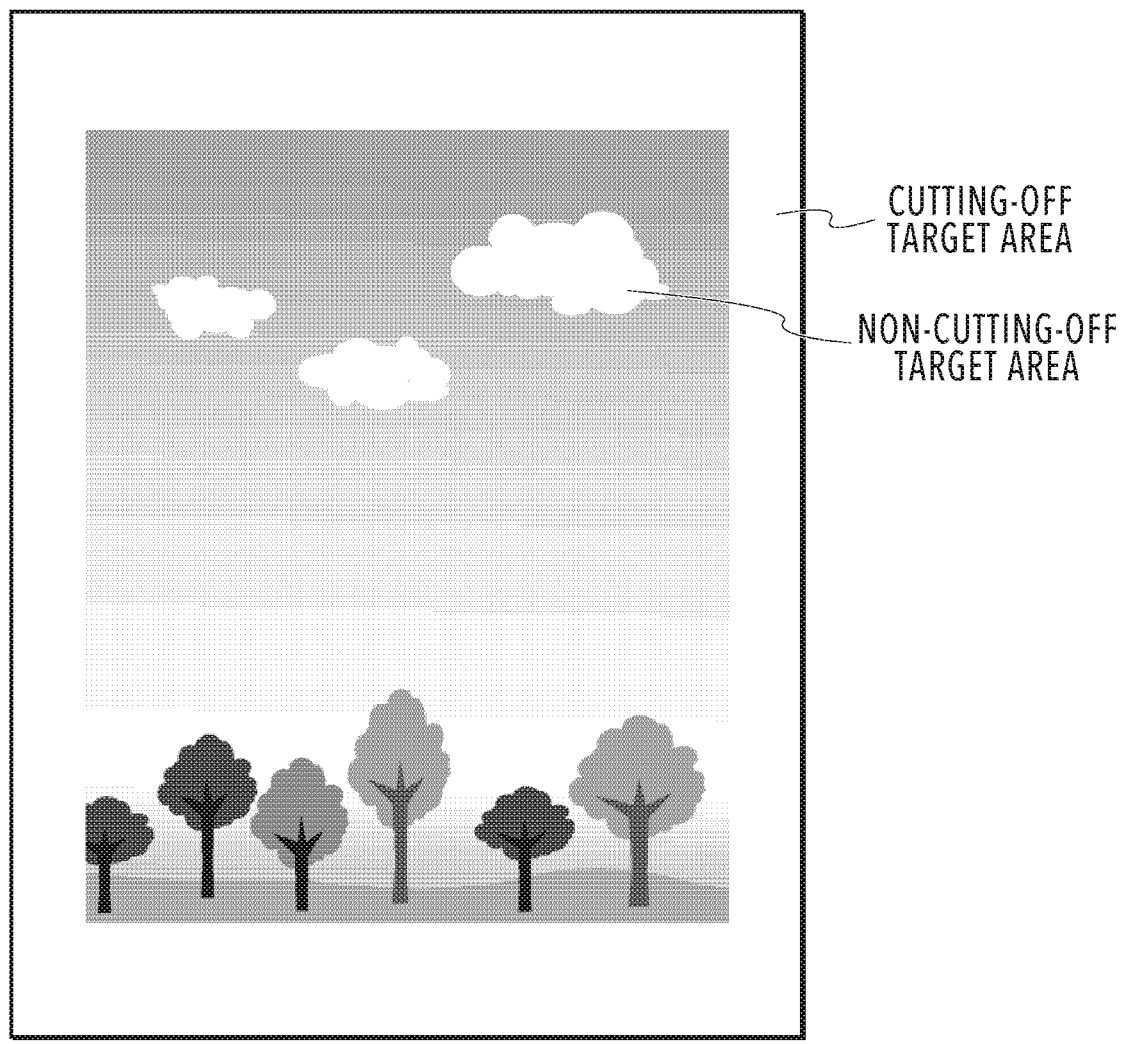
FIG. 12 is a diagram showing an example of a cutting off-target area.

The above is the contents of the cutting off-target area specification processing. As described above, the area made up of the pixel determined to be the cutting off-target pixel of the pixels within the cutting off-target image is specified as a cutting off-target area. FIG. 12 is a diagram showing an example of a cutting off-target area. In this example, while the entire white area of the outer frame is the cutting off-target area, the white area at the center within the image (the cloud) is the non-cutting off-target area.

<Cutting Off-Drawing Command Addition Processing>

Figure 13:
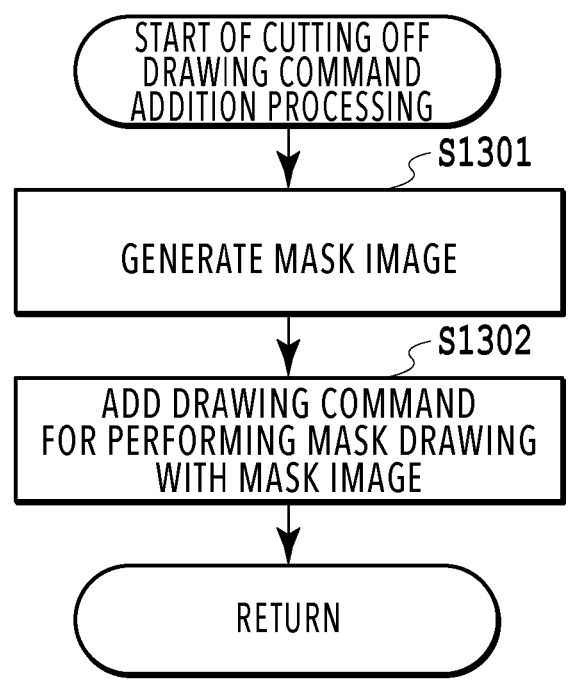
FIG. 13 is a flowchart showing a flow of cutting-off drawing command addition processing.

FIG. 13 is a flowchart showing a flow of the cutting off drawing command addition processing. In the following, along the flow in FIG. 13, detailed explanation is given with reference to a specific example of a cutting off drawing.

Figure 14A:
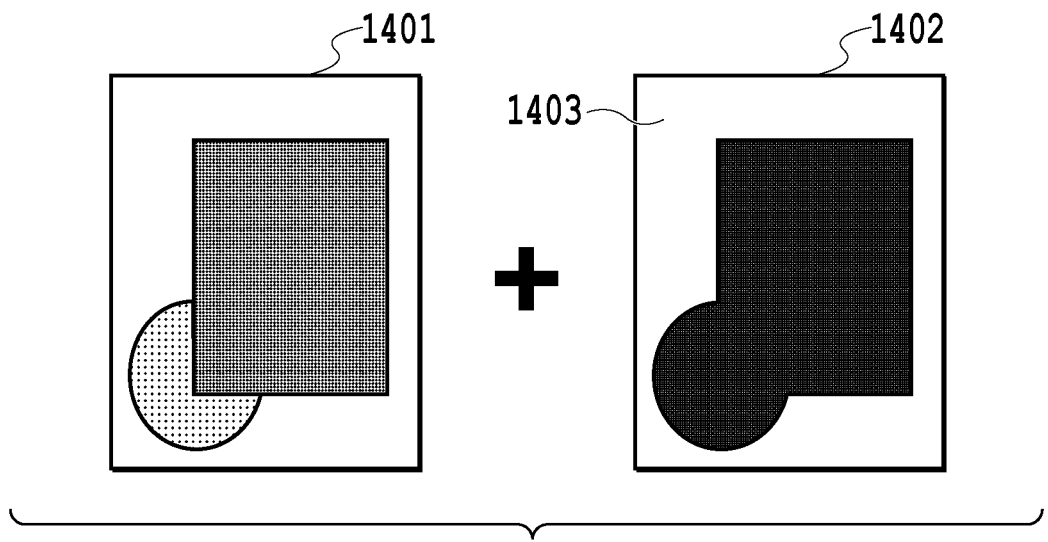
FIG. 14A and FIG. 14B are diagrams explaining variations of a cutting-off drawing.

At step 1301, a drawing (here, mask image) for cutting off only the area determined to be a cutting off-target area is generated for a processing-target image object. The mask image is an image in the bitmap format having the same width and the same height as those of the processing-target image object and in which "0" is set to the pixel making up the cutting off-target area (area that is not drawn) and "1" is set to the pixel making up the non-cutting off-target area (area that is drawn and left finally). FIG. 14A is an explanatory diagram of a mask image. By superimposing a mask image 1402 on a processing-target image 1401 and performing drawing (mask drawing), it is possible to cut off only a cutting off-target area 1403.

At step 1302, a drawing command for performing mask drawing with the mask image generated at step 1301 is added. This addition is implemented by adding a new drawing command for mask drawing. Alternatively, it may also be possible to change the drawing command for the processing-target image object to a drawing command including the contents of mask drawing.

Figure 14B:
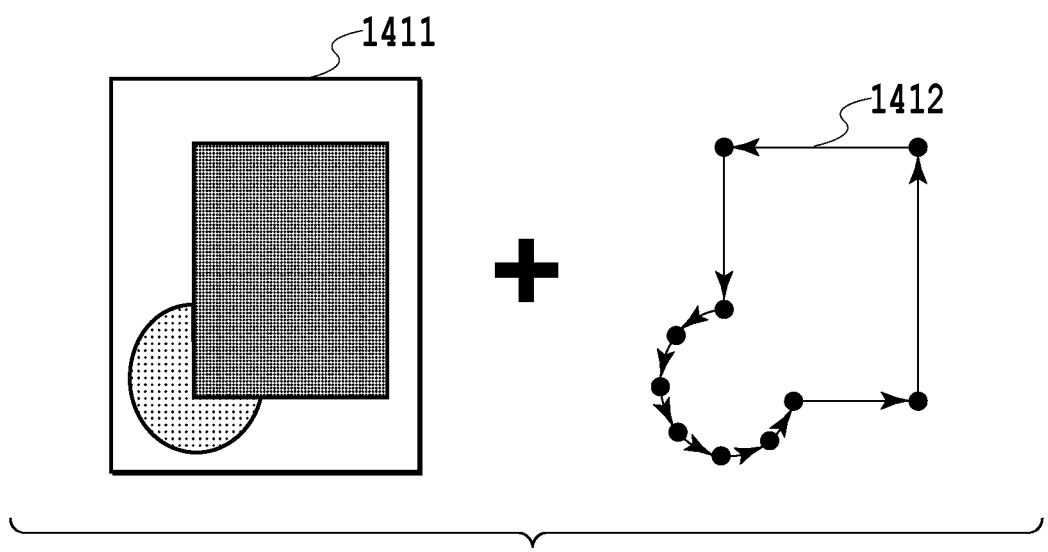

The above is the contents of the cutting off drawing command addition processing. Due to this, it is made possible to cut off only the white area that should be cut off in the processing-target image object. The cutting off drawing command is not limited to the above-described mask drawing command. For example, a clip drawing command shown in FIG. 14B may be used. In the case of a clip drawing command that limits a drawing area by using a clip path, by adding a clip drawing command of a clip path 1412 indicating the area that is finally drawn, it is possible to obtain the same results as those of the above-described mask drawing command. Further, it may also be possible to replace the pixel making up a cutting off-target area with a completely transparent pixel (specify an alpha value indicating a transparency of 100%).

The above is the contents of the cutting off drawing command addition processing.

According to the present embodiment, of the white area within an image object, an area for which raster image generation processing has been performed on the premise that the background is white is specified, and a print job in which the area is cut off is generated and sent to the printing apparatus. Due to this, it is made possible to prevent the occurrence of an unnatural white area that impedes layer printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the situation where layer printing is performed, it is possible to prevent an unnatural white area from occurring on the periphery of a drawing object for which raster image generation processing on the premise that the background is white has been performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-129137, filed Jun. 30, 2017 which is hereby incorporated by reference wherein in its entirety.

What is claimed is:

1. An information processing apparatus comprising:
a processor; and
a memory for storing a printer driver, wherein
the processor causes the printer driver to perform:
accepting, from software different from the printer driver, first drawing data including rasterized object data and information of a print processing type;
specifying, in a case where the print processing type included in the first drawing data is a predetermined print processing type, a target area in the rasterized object data;
generating second drawing data based on the accepted first drawing data so that the specified target area of the rasterized object data is not drawn;
generating PDL data based on the second drawing data; and
transmitting the PDL data to an image forming apparatus,
wherein the software performs raster image generation processing based on object data received from an application different from the software to generate the rasterized object data.

2. The information processing apparatus according to claim 1, wherein
a white area located inside the rasterized object data is specified as the target area.

3. The information processing apparatus according to claim 1, wherein
the processor causes the printer driver to further perform determining a target rasterized object data from one or more pieces of object data included in the first drawing data, and
the specification of the target area is performed for the determined target rasterized object data.

4. The information processing apparatus according to claim 3, wherein
the determination of the target rasterized object data uses, as a condition for the determination, that an edge pixel area of each rasterized object data included in the first drawing data does not have a color except for white.

5. The information processing apparatus according to claim 4, wherein
the determination of the target rasterized object data further uses, as a condition for the determination, that each object data included in the accepted drawing data is not a picture, and another object does not exist behind the white area of the object data.

6. The information processing apparatus according to claim 4, wherein
the determination of the target rasterized object data further uses, as a condition for the determination, that each rasterized object data included in the accepted drawing data is a picture and has a white frame, and another object does not exist behind the white area of the rasterized object data.

7. The information processing apparatus according to claim 6, wherein
the processor causes the printer driver to further perform counting a first number of
consecutive white pixels from a top edge pixel area toward the inside, a second number of consecutive white pixels from a bottom edge pixel area toward the inside, a third number of consecutive white pixels from a left edge pixel area toward the inside, and a fourth number of consecutive white pixels from a right edge pixel area; and
in a case where the minimum value of numbers among the first number, the second number, the third number, and the fourth number is larger than or equal to a predetermined number of pixels, it is determined that the rasterized object data is an object data having the white frame.

8. The information processing apparatus according to claim 1, wherein
the generating of the second drawing data is performed by adding, to the first drawing data, a drawing command for preventing the rasterized data of the specified target area from being drawn by the image forming apparatus.

9. The information processing apparatus according to claim 8, wherein
the added drawing command is a mask drawing command using a mask image for preventing the rasterized data of the specified target area from being drawn.

10. The information processing apparatus according to claim 8, wherein
the added drawing command is a clip drawing command using a clip path for preventing the rasterized data of the specified target area from being drawn.

11. The information processing apparatus according to claim 1, wherein
the generating of the rasterized object data is performed by replacing a pixel making up the specified target area in the rasterized object data with a transparent pixel.

12. The information processing apparatus according to claim 1, wherein
the specification of the target area and the generating of the second drawing data are performed in a case where the print processing type included in the drawing data is a layer printing.

13. The information processing apparatus according to claim 12, wherein
the layer printing is background copy-forgery-inhibited pattern printing.

14. The information processing apparatus according to claim 12, wherein
the layer printing is form overlay printing.

15. The information processing apparatus according to claim 1, wherein
the software is software for performing processing for converting GDI data obtained from the application into XPS data.

16. A method of generating a print job, the method comprising the steps of:
- accepting, from software different from a printer driver, first drawing data including rasterized object data and information of a print processing type;
- specifying, in a case where the print processing type included in the first drawing data is a predetermined print processing type, a target area in the rasterized object data;
- generating second drawing data based on the accepted first drawing data for preventing the specified target area of the rasterized object data from being drawn;
- generating PDL data based on the second drawing data; and
- transmitting the PDL data to an image forming apparatus;
- wherein the software performs raster image generation processing based on object data received from an application different from the software to generate the rasterized object data.

17. A non-transitory computer readable storage medium storing a program for causing a computer to perform:
- accepting, from software different from a printer driver, first drawing data including rasterized object data and information of a print processing type;
- specifying, in a case where the print processing type included in the first drawing data is a predetermined print processing type, a target area in the rasterized object data;
- generating second drawing data based on the accepted first drawing data for preventing the specified target area of the rasterized object data from being drawn;
- generating PDL data based on the second drawing data; and
- transmitting the PDL data to an image forming apparatus,
- wherein the software performs raster image generation processing based on object data received from an application different from the software to generate the rasterized object data.

* * * * *